United States Patent

[11] 3,588,220

[72] Inventors T. O. Paine
Acting Administrator of the National Aeronautics and Space Administration with respect to an invention of;
Willard H. Wells, Los Angeles, Calif.
[21] Appl. No. 787,846
[22] Filed Dec. 30, 1968
[45] Patented June 28, 1971

[54] ROTABLE ARCUATE REFLECTOR SYSTEM FOR TELESCOPES
3 Claims, 4 Drawing Figs.

[52] U.S. Cl. .................................................... 350/55, 350/310
[51] Int. Cl. .................................................... G02b 17/00
[50] Field of Search .......................................... 250/203, 296; 350/6.7, 55, 81, 24, 27, 310; 343/(Inquired)

[56] References Cited
UNITED STATES PATENTS

| | | | |
|---|---|---|---|
| 2,184,615 | 12/1939 | Gunther | 350/24 |
| 2,947,872 | 8/1960 | Carbonara et al. | 250/203 |
| 2,966,591 | 12/1960 | McCartney | 250/203 |
| 2,976,533 | 3/1961 | Salisbury | 343/727 |
| 3,331,072 | 7/1967 | Pease | 350/55X |
| 3,118,437 | 1/1964 | Hunt | 350/294UX |
| 3,503,664 | 3/1970 | Hadley | 350/55 |

OTHER REFERENCES
Strong, "Balloon Telescope Optics," Applied Optics, Vol. 6, No. 2, Feb. 1967 pp. 179— 189.

Primary Examiner—David Schonberg
Assistant Examiner—Toby H. Kusmer
Attorneys—J. H. Warden, Monte F. Mott and G. T. McCoy ABSTRACT: A reflector system having particularly advantageous application to line-of-sight pointing and tracking telescopes and characterized by a primary system including an arcuate, striplike segment of a dished, reflecting surface mounted for azimuth rotation and a secondary system supported for elevational rotation about an axis fixed relative to the surface of the segment at a point such that the secondary system is caused to describe an arc intersecting points adjacent to the foci of the primary system, whereby the surface of the segment serves as a primary light-gathering surface for an optical telescope as the telescope is employed to train and track a moving point-source of light throughout the celestial hemisphere.

3,588,220

PATENTED JUN 28 1971

WILLARD H. WELLS
INVENTOR

ATTORNEY

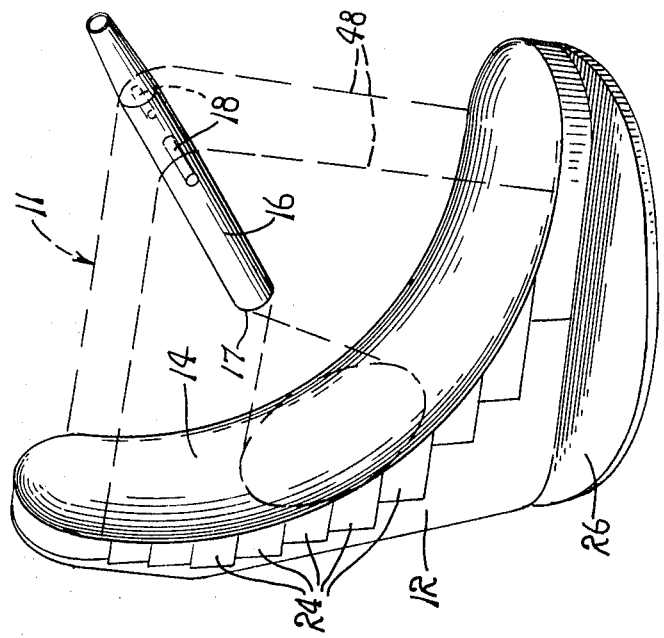
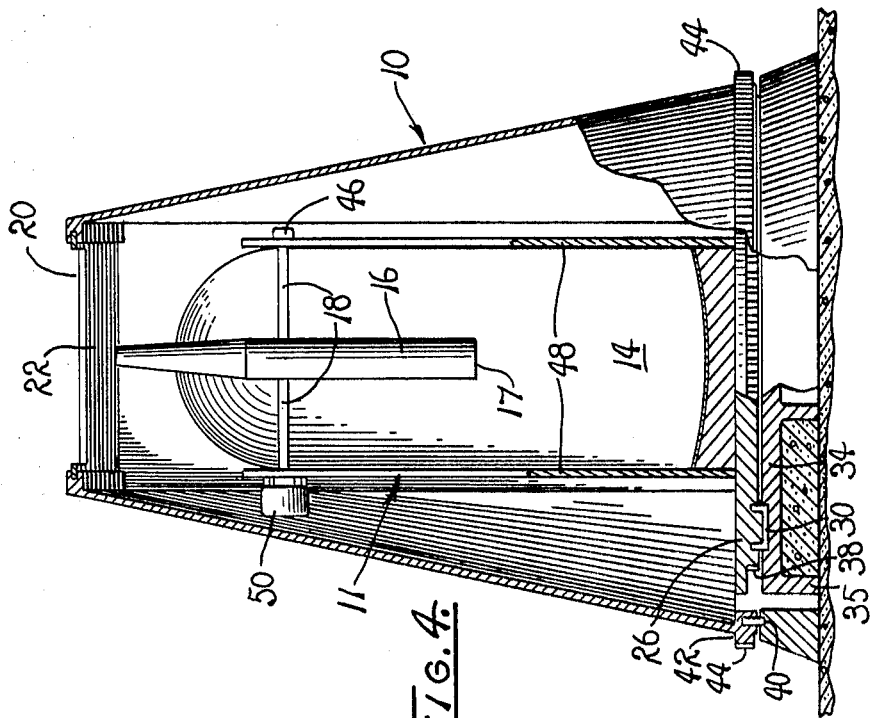
WILLARD H. WELLS
INVENTOR

ROTABLE ARCUATE REFLECTOR SYSTEM FOR TELESCOPES

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The invention relates to reflector telescopes and more particularly to an improved primary-secondary telescopic system having advantageous application to tracking devices.

2. Description of the Prior Art

The prior art includes various types of reflectors employed as primary reflectors for large aperture telescopes. Normally, such reflectors are fabricated from a large number of blocklike members which are assembled to form a support for a parabolic or hemispheric mirror or reflecting surface. The mirror or reflecting surface is mounted in a manner such as generally to be directed towards the portion of the celestial hemisphere to be scanned so that reflected light may be gathered and focused into a receiver lens or secondary mirror positioned at or near the focus of the curved surface. Where large aperture telescopes, such as, for example, the 200 inch and larger telescopes are employed, the support for the primary reflector necessarily requires a large number of compensating devices, and is of extensive mass. In order to observe celestial bodies located at different positions in space, it frequently is desirable to reorient the primary reflector relative to the earth's surface. This reorientation or movement of the reflector and its supporting structure introduces surface distortion or optical misalignment in the reflecting surface due to rotation of the mass relative to the gravity vector as the reflector is moved. Various techniques have heretofore been employed in correcting the misalignment. One of the techniques presently employed in minimizing such distortions is to adjust the individual support points on the primary reflector. However, such techniques are complex and maintenance of alignment for the segments requires continued mechanical realignment or, alternatively, a provision of a second level of counterweights which serve to compensate for gravity deflections of the structure employed to support and position the counterweighted segments. Therefore, reflector systems presently employed in the tracking of radiating bodies across the reaches of space have not proven to be entirely satisfactory, particularly where rapid reorientation of large aperture optical systems is necessitated in operations similar to tracking operations.

OBJECTS AND SUMMARY OF THE INVENTION

This invention overcomes the aforementioned difficulties through the use of a primary reflector including a relatively small segment of one quadrant of the concave surface of a hemispheric reflector, operatively supported by hydrostatic bearing structure for rotation about an azimuth axis, and an elevatable secondary reflector system fixed relative to the primary reflector, whereby reorientation of the primary reflector is accommodated without introducing gravity inducted deviation and optical misalignment.

Accordingly, an object of this invention is to provide an improved reflector system for telescopes.

Another object is to provide a primary reflector for use in telescopes for tracking moving bodies through extraterrestrial space.

Another object is to provide an improved primary-secondary reflector system adapted to be rotated through 360° of azimuth in dual-mode, extraterrestrial tracking telescopes.

Still another object is to provide a rotatable mount for a primary reflector particularly adapted for use in telescopes and supported for rotation through 360° of azimuth rotation, while minimizing or avoiding gravity induced deflection in the associated reflecting surface.

Another object is to provide a large primary optic system for optical-space communication systems adapted to be rotated about an azimuth while avoiding complex counterbalancing for overcoming the effects of gravity induced deflections normally encountered in the reorientation of primary reflectors employed in optical telescopes.

These together with other objects and advantages will become more readily apparent by reference to the following description and claims in light of the accompanying drawings.

DESCRIPTION OF THE DRAWINGS

FIG. 3 is a perspective view of the primary and secondary reflector system illustrated in FIGS. 1 and 2.

FIG. 4 is a partially sectioned front elevational view of the reflector and an associated telescope.

DESCRIPTION OF THE INVENTION

Figure 1:
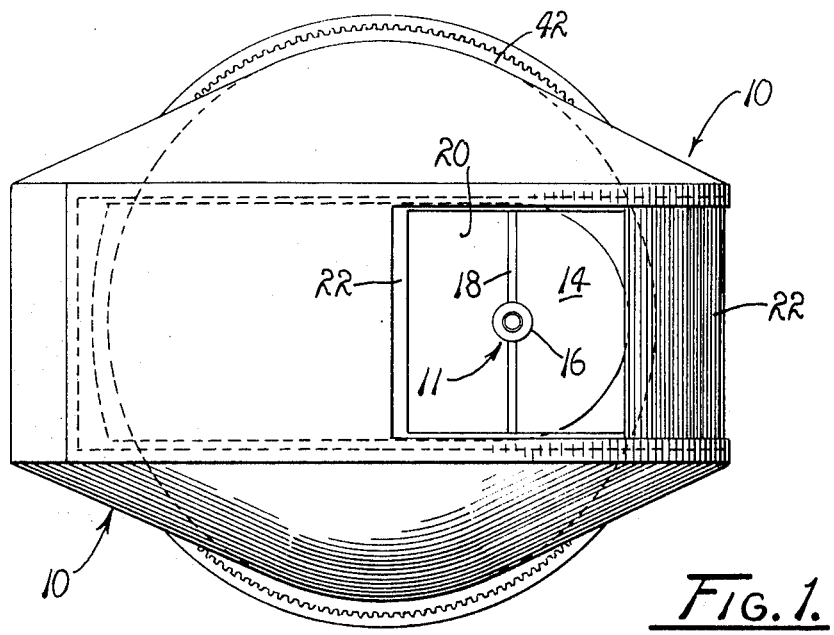
FIG. 1 is a top plan view of an observatory including therein a telescope and its reflector system supported by structure embodying the principles of the present invention.

With particular reference to FIG. 1, there is illustrated a protective housing or enclosure 10 within which is mounted a large aperture, optical telescope 11, including a rotatably displaceable primary reflector 12. The primary reflector 12 is preferably disposed symmetrically about a vertical plane and is provided with a compound curve reflecting surface 14 having predetermined optical characteristics. Mounted in radial displacement relative to the surface 14, for receiving light reflected from the surface 14, there is provided a secondary optic system 16. The secondary system, per se, is of well-known optical design and no detailed description is deemed necessary to provide a complete understanding of the invention other than that it collects light reflected from the reflector 12 and permits it to be focused for ocular examination, recording or the like. However, it should be understood that the secondary system 16 is of a type which includes a secondary receiver input 17 which may be a reflector or focusing lens, as preferred, mounted for rotation in the plane of symmetry of the reflector 12 to be displaced through an arcuate path adjacent to the foci of the curved surface 14 so that light reflected from the primary may be received at the input 17 of the secondary system 16.

Figure 2:
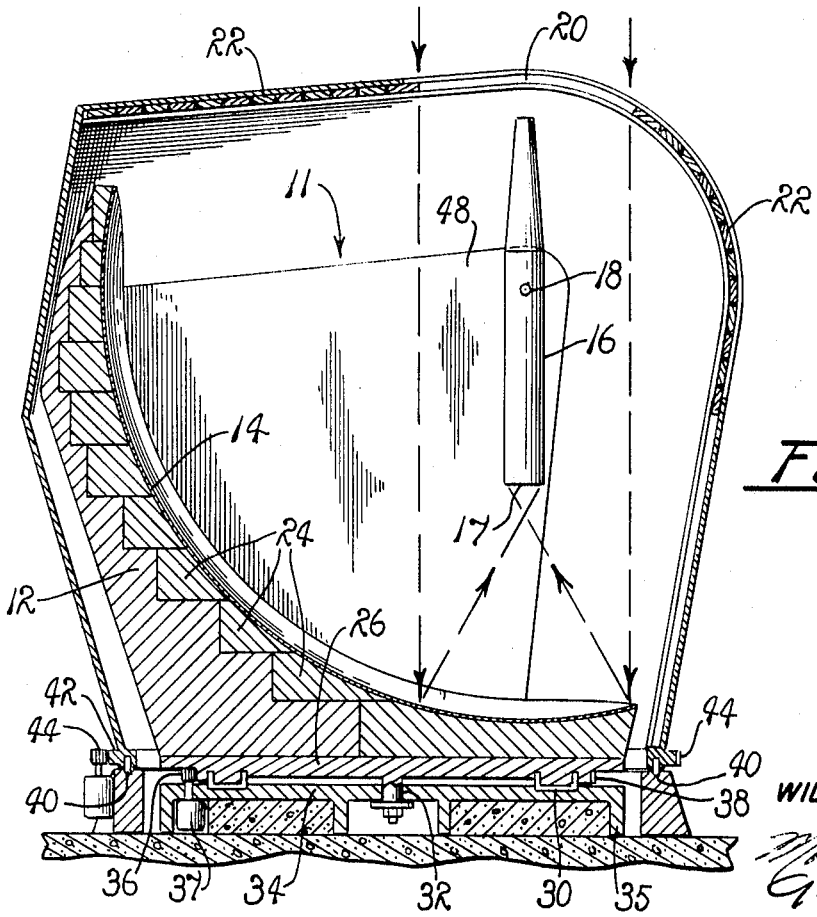
FIG. 2 is a cross-sectional side elevation of the observatory of FIG. 1, particularly illustrating the mounting for the primary reflector employed to direct the light to the secondary reflector system of the reflector system.

Suitable means including a trunnion 18, FIG. 2, is employed to support the secondary optic system 16 for elevational displacement about an axis extending transversely with respect to the vertical plane within which the reflector 12 is disposed. It is to be understood that the axis of rotation for trunnion 18 is fixed relative to the reflector 12 so that the optic system 16 can be rotated only in the plane of symmetry about the trunnion so that the receiver input 17 of the secondary system 16 may only be displaced along an arc adjacent to an arc defined by the foci of the reflector 12.

In practice, the housing 10 is provided with a slotted opening 20 through which light may be propagated from a celestial body to impinge upon the surface 14 of the reflector 12. As is common practice, a flexible, roller-and-track door 22 is employed for closing the opening 20, where such closure is desired. As doors of this type are of well-known design, a detailed description thereof is omitted, however, it should be understood that the door is capable of being displaced along its track in a manner such as selectively to open portions of the slot 20 so that the input 17 of the secondary reflector system of the telescope may be elevated or depressed through 90° for tracking a radiating body disposed in extraterrestrial space as body-propagated light impinges on and is reflected from the primary reflector surface 14.

The primary reflector 12 is fabricated in any suitable manner. Normally, such structure includes a plurality of blocklike support members 24, which serve as a support for the reflecting surface 14. The material from which the reflecting surfaces 14 is fabricated may be any one of several well-known materials such as, for example, aluminum evaporated on highly polished glass blocks. The surface is shaped as a striplike segment of one quadrant of the internal surface of a hemisphere or, alternatively, a paraboloid, and preferably is so formed as to include arcuate side edges disposed in parallel planes. The segment is of an operable length slightly greater than 90° so that the secondary optic system may "look" at the reflecting surface of the primary reflector as it is elevated and depressed through an included angle of 90°.

Since the trunnion 18 is supported in fixed position relative to the reflector 12, it is readily apparent that the receiver 17 receives light from only a portion of the surface 14 of the reflector 12 at any given setting. Hence, the particular width of the segment employed is determined by the largest portion of the reflecting surface which will be required to fill the input or aperture of the secondary optic system. As a practical matter the width of the segment approximates the diameter of the telescope's aperture, as illustrated in FIGS. 1, 2 and 3, taken together. Hence, the area of the segmented primary reflector required for full hemispheric coverage is dictated by the area required to provide the reflected light and the elevation angle coverage required. This may be readily determined and expressed as a ratio of the area of the mirror of the primary optic system to the area of the aperture of the receiver for the secondary system, as follows:

$A\text{mirror}/A\text{aperture} = 8(f/\text{no.}) \quad [4(f/\text{no.}) - \sqrt{16(f/\text{no.})^2 - 1} + \frac{1}{2}];$ where $A$ is area, and the lens aperture of the receiver 17 for secondary optic system 16 is expressed as an $f$-number.

Since the relative displacement between the primary reflector 12 and the secondary optic system 16 is limited to displacement in vertical directions when the plane of symmetry is vertical, it is necessary that the support means be provided for supporting the primary and secondary optic systems for rotation in azimuth, whereby the telescope 11 can be "pointed" toward any point of the compass. Therefore, a rotatable support plate 26 is provided as a member for operatively supporting both the primary and secondary optic systems.

In practice, the plate 26 is horizontally disposed in a level disposition and is supported by a concentrically aligned hydrostatic bearing 30, which accommodates 360° of azimuth rotation for plate 26 and therefore the primary reflector 12 and its associated secondary optic system 16. As a practical matter, the plate 26 is also supported by a vertically aligned bearing structure 32 about which it is operatively rotated. The bearing 32 is of any suitable design with its axis serving as the azimuth axis for the telescope 11. The azimuth axis passes through the center of gravity of the entire rotating structure including the reflector 12 and the secondary optics package 16. Hence, it should be readily apparent that operative rotation of the telescope does not introduce gravity induced deflections normally encountered when a primary reflector is reoriented, or caused to be realigned in "course" alignment.

A planar support including a coaxially aligned disclike support member 34 serves as a fixed base for supporting the bearing structure 30 as the bearing structure supports the plate 26. This support is provided with conventional footings 35, as desired, and is of a material possessing tensile and compressive strength sufficient for supporting the total mass of the telescope.

The bearing 30 is of a channular configuration fabricated from machined steel and mounted in supporting concrete in a known manner for obviating distortion of the bearing surfaces. Furthermore, the hydrostatic bearing 30 includes suitable means for connecting the bearing with suitable fluid pumps and fluid heaters provided and arranged in a manner and for purposes well known to those familiar with the bearing art. As is common practice, the bearing 30 includes a sealed channel having two opposed planar surfaces disposed therein and maintained in a mutually spaced relationship by means including a thin film of oil. The oil is maintained under adequate pressures and prevents an occurrence of physical contact between the surfaces. The fluid heaters and fluid pumps employed serve to supply the oil at appropriate temperatures thus to maintain the desired pressure, viscosity and film thickness in a changing ambient temperature environment, as is normally encountered in the operation of telescopes employed in celestial tracking. Furthermore, the support plate 26 and planar support 34 are of a rigid design in order to avoid the tendency to undergo undesired bucking as is normally encountered in supporting a large mass.

While various means may be employed in driving the plate 26, as well as the structure supported thereby, in rotation about the azimuth axis, a plurality of driven pinion gears 36 is provided. The gears 36 are synchronously driven by suitable motors 37, and are meshed with a ring gear 38 affixed to the base 26. The motors 37 are of any suitable design, but preferably possess high-torque, low-speed characteristics.

Since the reflecting surface 14 must "look" through the slot 20, it is necessary that means be provided for rotating the housing 10 in synchronism with the rotation of the base 26 for thus maintaining the alignment established between the slot 20 and the surface 14. The rotation is achieved through means including suitable bearing structures mounted on a base 42. The structures 40 serve to support the housing 10 for rotation through 360° about a vertical axis, preferably coinciding with the azimuth axis about which the telescope 11 is operatively rotated.

It is intended that the enclosure 10 serve to protect the telescope 11 from the adverse effects of environment, particularly wind loads and excessive thermal inputs or dissipation. The structure is of a relatively lightweight construction. Therefore, the bearing mechanism 40 is of simple design. In order to achieve the desired rotation for the housing 10, an additional pinion and ring gear arrangement 44 preferably is included for driving the housing 10 in synchronism with the driving of the plate 26 of the telescope 11. The ring and pinion gearing 44 is similar in design to that of the pinion 36 and gear 38. Therefore, a detailed description thereof is omitted in the interest of brevity.

The trunnion 18 employed for supporting the secondary optic system 16 is seated in suitable bearings 46. The bearings 46 are disposed within the uppermost portions of vertical support columns 48. The columns 48 are mounted on the base plate 26 at opposite sides of the primary reflector 12. Since the primary reflector is of a limited width it should be readily appreciated that the span of the trunnion 18 is of relatively limited length. Therefore, desired alignment of the trunnion 18 can readily be maintained within a practical range.

In practice, means including a pair of servomotors 50 including therein a suitable gear train, are mounted on the columns 48 adjacent the pinion 18 and are geared to the pinion to impart the desired rotation thereto. The motors 50, if desired, are of a design similar to the motors employed in driving the pinions 38 and are selectively operable for imparting opposing rates of rotation to the trunnion 18 so that the receiver input 17 of the secondary optic system 16 may be depressed or elevated at selected rates. Since suitable motors and gear trains are readily available, a detailed description of the motors and the gearing employed for rotating the system 16 and trunnion 18 is also omitted in the interest of brevity.

OPERATION

It is believed that the operation of the described embodiment of the present invention is readily apparent but such operation will be briefly reviewed at this point. In order for the telescope 11 to be effectively employed for acquiring and tracking an object passing through extraterrestrial space, it is necessary for the slot 20 of the housing 10 to be opened and aligned so that light from the object may be propagated from the object to impinge on the reflecting surface 14. As light is impinged upon the surface 14, it is collected, reflected and focused at the receiver input 17 of the secondary optic system 16. As the body being tracked changes its relative position along a path extending between the horizon and the zenith, the input 17 is rotatably driven by the motors and gear trains 50 about the trunnion 18. Consequently, the body being tracked may be followed from the horizon to the zenith simply by elevating or depressing the secondary optic system so that the input 17 continues to be repositioned so that it continues to receive light focused by the surface 14.

Since, as a practical matter, the body being tracked normally does not pass directly from a point on the horizon to the zenith, it is necessary that the primary reflector 12 be rotated in azimuth for aligning the surface 14 so that it continues to be operatively aligned with the body being tracked. This alignment is achieved by driving the pinions 36 causing them to act in cooperation with the ring gear 38, whereby the telescope 11 is driven in azimuth rotation. Simultaneously with the actuation of the pinion 36, the ring and pinion 44 are activated for rotatably driving the housing 10 along the surface of the bearing 40. Hence, the entire optical system is driven in both elevation and azimuth simultaneously through the actuation of the pinions for tracking a body moving through the celestial hemisphere.

In view of the foregoing, it should be readily apparent that the described embodiment of the instant invention provides a practical structure for accommodating rapid reorientation of a telescope without introducing gravity induced deflection in the reflecting surface of the primary optic system.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

I claim:
1. A device for use in line-of-sight tracking of a point source of radiation disposed in extraterrestrial space comprising:
   a. a horizontally oriented base;
   b. a hydrostatic bearing supported on said base;
   c. a horizontally oriented base plate mounted on said bearings adapted to be rotated through 360° of azimuth rotation about a fixed vertical axis;
   d. a primary optics system including means defining a primary reflector surface having a configuration conforming to an elongated vertically disposed segment of a concave surface having an arcuate length in excess of 90°, symmetric with respect to a vertically disposed plane and adapted to focus reflected light at foci displaced along an arc within the plane;
   e. mounting means supporting the primary reflector on said base plate in a manner such that the vertical axis is extended through a lower end portion of the segment;
   f. a trunnion normally related to said plane radially displaced from the surface of said segment; and
   g. a secondary optic system, including a receiver supported by said trunnion adapted to be pivotally displaced relative to said surface in a manner such that the receiver is caused to traverse said arc, whereby a source of light may be tracked through a hemisphere as the primary optic system is rotated about said fixed vertical axis and said secondary system simultaneously is displaced relative to said surface in a manner such that the receiver is caused to traverse said arc.

2. The device of claim 1 wherein the surface is a segment of a spheroid.

3. The device of claim 1 wherein the surface is a segment of a paraboloid.